United States Patent
Samain et al.

(10) Patent No.: US 9,297,115 B2
(45) Date of Patent: Mar. 29, 2016

(54) BARRIER FILM WITH MOLECULAR EXPANSION UNDER STRAIN

(71) Applicants: CENTRE NATIONAL DE LA RECHERCHE SCIENTIFIQUE (CNRS), Paris (FR); CENTRE TECHNIQUE DU PAPIER, Gieres (FR)

(72) Inventors: Daniel Samain, Meylan (FR); Camélia Stinga, Grenoble (FR); David Guerin, Chamaliere (FR); Markus Schmid, Zolling (DE); Klaus Noller, Tiefenbach/ast (DE)

(73) Assignees: CENTRE NATIONAL DE LA RECHERCHE SCIENTIFIQUE (CNRS), Paris (FR); CENTRE TECHNIQUE DU PAPIER, Gieres (FR)

( * ) Notice: Subject to any disclaimer, the term of this patent is extended or adjusted under 35 U.S.C. 154(b) by 0 days.

(21) Appl. No.: 14/376,308

(22) PCT Filed: Feb. 4, 2013

(86) PCT No.: PCT/EP2013/052156
§ 371 (c)(1),
(2) Date: Aug. 1, 2014

(87) PCT Pub. No.: WO2013/113927
PCT Pub. Date: Aug. 8, 2013

(65) Prior Publication Data
US 2014/0374044 A1    Dec. 25, 2014

(30) Foreign Application Priority Data
Feb. 2, 2012 (FR) ..................................... 12 50992

(51) Int. Cl.
| | |
|---|---|
| *D21H 17/36* | (2006.01) |
| *C08J 7/12* | (2006.01) |
| *C08J 7/14* | (2006.01) |
| *C08F 16/06* | (2006.01) |
| *D21H 17/28* | (2006.01) |
| *C03C 17/30* | (2006.01) |

(52) U.S. Cl.
CPC ................ *D21H 17/36* (2013.01); *C03C 17/30* (2013.01); *C08F 16/06* (2013.01); *C08J 7/12* (2013.01); *C08J 7/14* (2013.01); *D21H 17/28* (2013.01); *C08J 2329/04* (2013.01)

(58) Field of Classification Search
USPC ............... 162/168.1; 428/336, 507, 384, 410; 427/248.1, 255.6; 525/56, 61
See application file for complete search history.

(56) References Cited

U.S. PATENT DOCUMENTS

| | | | |
|---|---|---|---|
| 3,934,587 A * | 1/1976 | Gordon | .......................... 604/364 |
| 6,342,268 B1 | 1/2002 | Samain | |
| 2011/0014458 A1* | 1/2011 | Stinga et al. | .................. 428/336 |
| 2014/0113080 A1 | 4/2014 | Stinga et al. | |

FOREIGN PATENT DOCUMENTS

| | | |
|---|---|---|
| FR | 2925910 A1 | 7/2009 |
| WO | WO 99/08784 A1 | 2/1999 |
| WO | WO 2009/083525 A1 | 7/2009 |

OTHER PUBLICATIONS

Biver et al., "Microphase Separation and Wetting Properties of Palmitate-graft-poly(vinyl alcohol) Films," Macromolecules, vol. 35, No. 7, 2002 (Published on the Web Feb. 23, 2002), pp. 2552-2559, XP002479530.
Borbély et al., "Grafting of Industrial Cellulose Pulp with Vinyl acetate Monomer by Ceric Ion Redox System as Initiator," Acta Polytechnica Hungarica, vol. 1, Issue 1, Jan. 2004, pp. 86-95.
Fatehi et al., "Effect of cationic PVA characteristics on fiber and paper properties at saturation level of polymer adsorption," Carbohydrate Polymers, vol. 79, 2010 (Available online: Aug. 27, 2009), pp. 423-428.
French Search Report dated Aug. 8, 2012 for French Application No. 1250992.
Gupta et al., "Grafting of Acrylonitrile and Methyl Methacrylate from Their Binary Mixtures on Cellulose Using Ceric Ions," Journal of Applied Polymer Science, vol. 79, 2001, pp. 767-778.
Horn et al., "Treatment of Kraft Paperboards and a Kraft Pulp with Acrylonitrile," U.S. Forest Service Research Note FPL-083, Mar. 1965, 15 pages (pp. 1-11).
International Search Report dated Mar. 20, 2013 for International Application No. PCT/EP2013/052156 (Form PCT/ISA/210).
Levitt et al., "Aromatic Rings Act as Hydrogen Bond Acceptors", Journal of Molecular Biology, vol. 201,1988, pp. 751-754, XP055055648.
Liesiene et al., "Sorption of poly(vinyl alcohol) and its cationic derivative on silica oxide: effect of charge," Chemical Technology 2, vol. 36, pp. 51-56, ISSN 1392-1231, 2005, 1 page summary with abstract only provided.
Liesiene, "Coating of Silica Surface with Poly(vinyl alcohol): Effect of the Surface Charge," WG1, COST 868 Meeting in Elba, Italy, May 18-19, 2009, 2 pages.
Maruyama et al., "Study on the Composites of Colloidal Silica and Poly(vinyl alcohol) Modified with a Small Amount of Silanol Groups", Nippon Kagaku Kaishi, vol. 5, 1994, pp. 450-455, with English abstract.
Maruyama et al., "Study on the Interaction between Poly (vinyl alcohol) Containing Silanol Groups at Side Chains and Inorganic Substances," Nihon Kagaku Kaishi, vol. 4, 1994, pp. 365-370, with English abstract.
Moritani et al., "Functional modification of poly(vinyl alcohol) by copolymerization III. Modification with cationic monomers," Polymer, vol. 39, No. 3, 1998, pp. 559-572.

(Continued)

*Primary Examiner* — Mark Halpern
(74) *Attorney, Agent, or Firm* — Birch, Stewart, Kolasch & Birch, LLP

(57) ABSTRACT

A process for treating a solid substrate coupled to a polyol, wherein said polyol bears free hydroxyl groups, comprising the grafting of at least one fatty acid having an aliphatic chain comprising at least 12 carbon atoms onto said solid substrate coupled to a polyol by esterification of at least one free hydroxyl group of said polyol.

5 Claims, 3 Drawing Sheets

(56) References Cited

OTHER PUBLICATIONS

Figure 1:
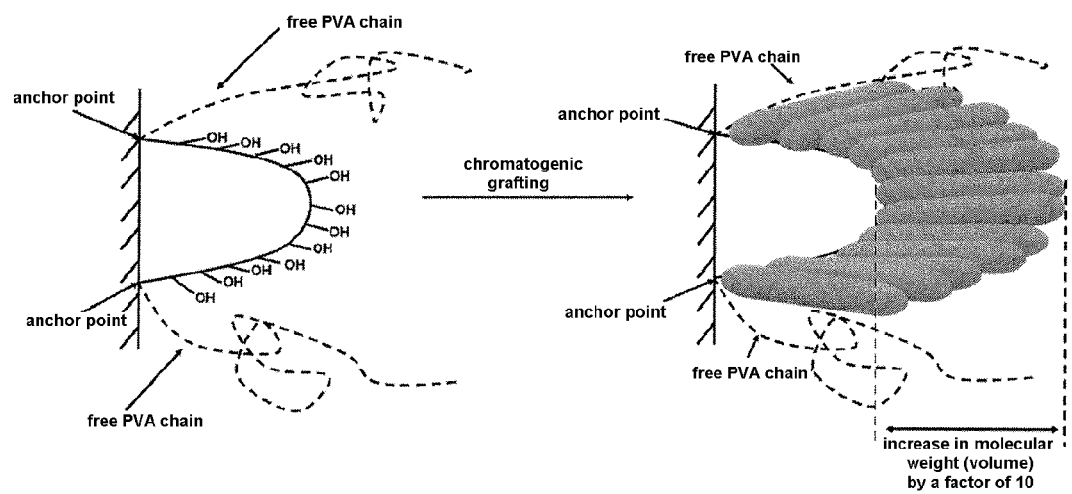

Moritani et al., "Functional modification of poly(vinyl alcohol) by copolymerization: 1. Modification with carboxylic monomers," Polymer, vol. 38, No. 12, 1997, pp. 2933-2945.

Moritani et al., "Functional modification of poly(vinyl alcohol) by copolymerization: II. Modification with a sulfonate monomer," Polymer, vol. 39, No. 3, 1998, pp. 553-557.

* cited by examiner

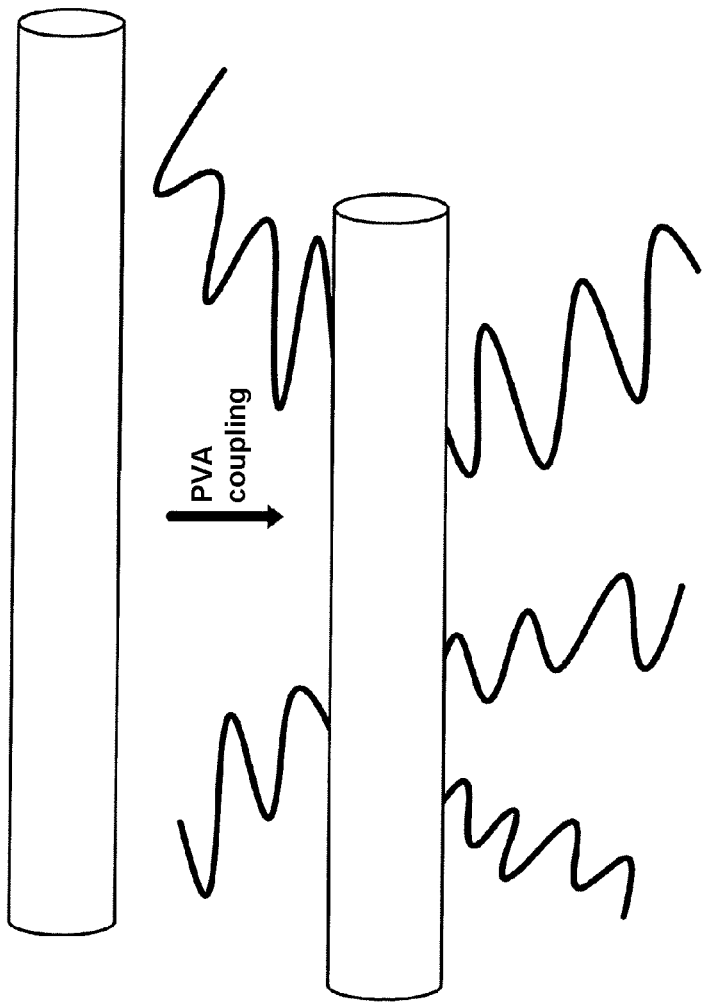

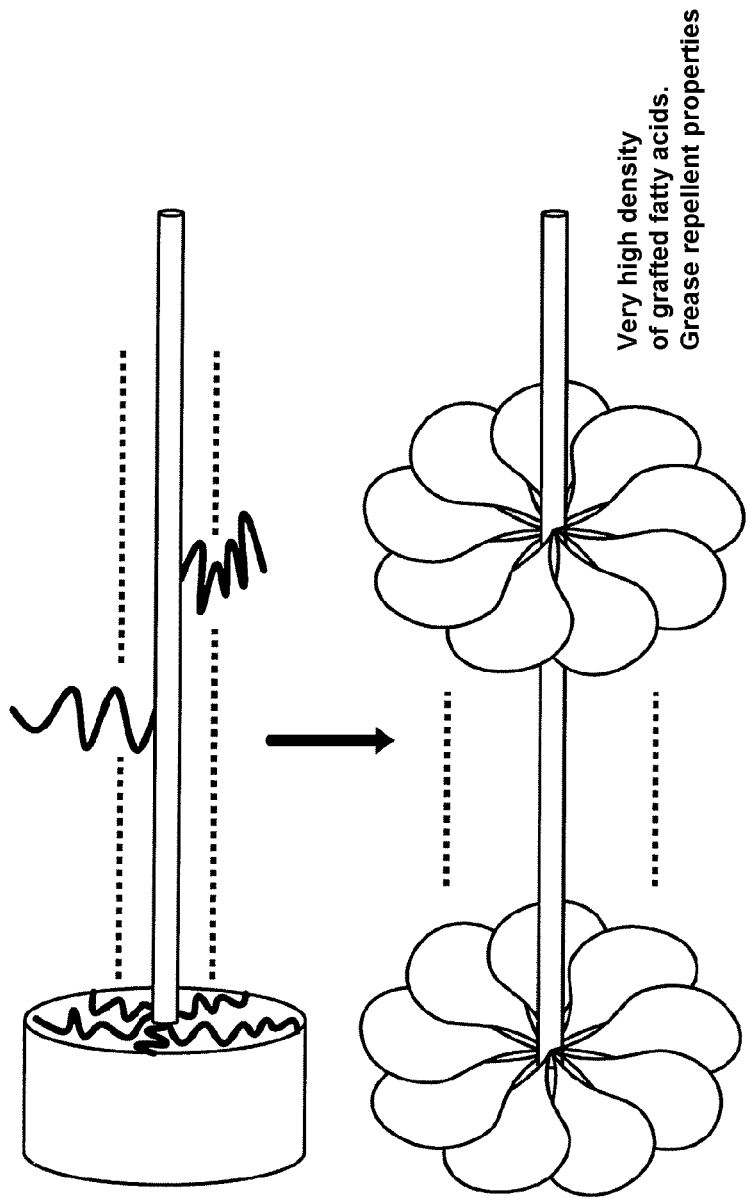

BARRIER FILM WITH MOLECULAR EXPANSION UNDER STRAIN

This application is a 371 of PCT/EP2013/052156 filed 4 Feb. 2013.

The present invention relates to a process for treating a solid substrate in order to form a barrier film containing linear polyols bound on this substrate and subsequently grafted with fatty acids.

We have shown that it was possible to confer superior hydrophobic properties to the surface of a solid substrate by covering the latter with a layer of polyvinyl alcohol (PVA) then reacting the surface of the latter with long-chain fatty acids according to the chromatogeny process (EP 1 007 202, WO2009/083525). We have in particular shown that, unexpectedly, the reaction was not limited just to the surface of the PVA layer but that it penetrated slightly in depth to form a thin film of completely acylated PVA. We have also shown that the barrier properties of the material thus obtained were a function of the molecular weight of the PVA chains. Indeed, we have shown that too-low molecular weights led to peracylation of the PVA chains resulting in dissociation thereof from the base of the underlying PVA and decreased barrier properties.

This phenomenon is explained by the fact that the cohesion of polyvinyl alcohol molecules to each other is due to the establishing of hydrogen bonds between the hydroxyl functional groups of these molecules. It is clear that these hydrogen bonds can no longer be established since the hydroxyls were derived by fatty acids. Only PVA molecules having sufficiently high molecular weights can remain associated with the base of the underlying PVA. Indeed, in this case, the length of the molecule enables it to possess a part inserted deeply in the PVA sublayer, shielded from the acylation reaction. Furthermore, the upper part, which undergoes the acylation reaction, has its molecular weight and thus its volume increase considerably. A steric problem is thus created which contributes to the performance of the hydrophobic barrier properties. Strong interactions between segments of the resulting acylated PVA are, obviously, directly responsible for the effectiveness of the barrier properties observed. In particular, elements that harm these strong interactions, such as the presence of hydrophilic inorganic charges within the PVA layer, result in degraded water-barrier properties.

The present invention proposes to extend the field of application of the acylation reaction between polyvinyl alcohol molecules and long-chain fatty acids by showing that this reaction can also take place not only when PVA molecules are associated with each other by hydrogen bonds but also when they are stably bound to a solid substrate by strong bonds insensitive to the acylation reaction.

What we have indeed discovered unexpectedly is that the association of PVA molecules with a solid substrate via strong bonds such as covalent or polyelectrolyte (or polyelectrostatic) bonds did not compromise the systemic reactivity of PVA molecules with respect to acylation. Symmetrically, we also verified that the quantitative grafting reaction of hydroxyls present on PVA chains thus bound to the substrate did not challenge the stability of the anchoring bond.

Indeed, what characterizes the reaction between PVA molecules bound together by hydrogen bonds and fatty acids under chromatogeny conditions is that the reaction penetrates inside the PVA layer to react with all the hydroxyls present. The fact that the reaction is quantitative through a certain thickness is well demonstrated by ATR analyses of IR spectra which show the total absence inside the acylated layer of bands characteristic of hydroxyls. What we show in the present invention is that this surprising systemic reactivity of PVA molecule hydroxyls is also maintained when the molecules are stably bound on a solid substrate, necessarily resulting in an even higher restriction of their degree of freedom.

This large reactivity is indeed very surprising because it must be understood that the acylation reaction of PVA chain hydroxyls results in a very large increase in their molecular weights (by a factor of 10), which could create significant steric problems. The fact of anchoring the PVA chains by strong bonds (and no longer as before by weak bonds) obviously very strongly increases these steric problems, and it was not at all obvious that PVA chains thus anchored could preserve their reactivity with respect to the fatty acids grafting reaction.

What we also show in the present invention is that this embodiment no longer depends, as in the case of PVA layers disclosed in the prior patent (WO2009/083525), on the length of the PVA chain. It is thus possible to select the length of the PVA chain (in particular of low molecular weight) according to the properties sought. This ability to use hydroxylated polymers of lower molecular weights without modification of barrier properties has also allowed us to show that it was possible to use other families of linear hydroxylated polymers or oligomers such as sorbitol or sorbitol oligomers. Cyclic hydroxylated polymers such as starch, much more hindered statistically, cannot be used for the invention.

The possibility for hydroxylated polymers such as PVA to stably join with solid substrates by strong covalent or polyelectrolyte (polyelectrostatic) bonds is, furthermore, well-known to persons skilled in the art. There are many examples where this association is described (Liesiene et al., 2005; Liesiene J, 2009; Fatehi P and Xiao H, 2010). PVA molecules are then either coupled by means of a coupling reagent or modified chemically, in such a way as to allow this interaction (Moritani T and Kajitani K, 1997; Moritani T and Yamauchi J, 1998a and 1998b). In the case of a solid substrate having on its surface ionic charges, the PVA molecules will have charges of opposite sign (Liesiene et al., 2005; Liesiene J, 2009). In the case of substrates silicic in nature, the PVA molecules will have silicate functional groups (Maruyama Hitoshi and Okaya Takuji, 1994a and 1994b); in the case of substrates calcic in nature, the PVA molecules will have phosphate functional groups; and in the case of a substrate with OH functional groups, the PVA molecules are, for example, bound by epichlorohydrin coupling, etc.

The process according to the invention thus comprises a step wherein hydroxylated polymer molecules are stably bound on a solid substrate then a step wherein hydroxylated polymer coupled to the solid substrate by strong bonds is directly subjected to the grafting reaction (FIG. 1). This grafting reaction induces a considerable increase in molecular weight since PVA has, for example, a monomer unit comprising 2 carbons and a hydroxyl. Grafting one fatty acid such as stearic acid per monomer unit leads to the addition of 18 carbons, i.e. an increase in molecular weight of a factor of 10. It can thus be considered that segments of hydroxylated polymer molecules grafted by fatty acids such as stearic acid "swell" by a factor of 10. It is not possible for polymer molecules bound by strong bonds to the solid substrate to move and segments of polymer molecules grafted by fatty acids must thus deform in order to swell in a restricted space. If the density of polymer bound on the surface is sufficient, a continuous film will then be formed by coalescence of segments of polymer molecules grafted by fatty acids. We have named the films thus obtained "barrier films with molecular expansion under strain." Strain is represented by the bonding of hydroxylated polymer molecules on the surface of the substrate and expansion by their "swelling" due to their reaction with fatty acids.

The processes according to the invention are particularly advantageous when it is sought to modify surfaces such as those of textile fibers where the presence of free hydroxylated polymer would be harmful on the one hand by introducing stiffness and on the other hand by not being suitable for washing conditions due to being water soluble. In the case of textile fibers, softness and "hand" are essential characteristics of product quality just as much as the ability to undergo washing in aqueous conditions. The invention thus makes it possible to obtain a stable hydrophobic coating.

SUMMARY

The invention is dedicated to a process for treating a solid substrate, comprising the following steps:
a) providing a solid substrate coupled to a linear polyol, said polyol bearing free hydroxyl groups,
b) grafting at least one fatty acid having an aliphatic chain comprising at least 12 carbon atoms on said solid substrate coupled to a polyol by esterification of at least one free hydroxyl group of said polyol.

Preferably, the solid substrate is coupled to the polyol by covalent bonds or polyelectrolyte (polyelectrostatic) bonds.

Preferably, the polyol is selected from PVA, sorbitol, alditols and alditol oligomers.

In one embodiment, the solid substrate and the polyol bear ionizable groups, the solid substrate and the polyol being coupled by polyelectrolyte (polyelectrostatic) bonds between said ionizable groups.

Preferably, the solid substrate bears an anionic group and the polyol is a cationic PVA or the solid substrate bears a cationic group and the polyol is an anionic PVA.

In another embodiment, the solid substrate bears silanol groups and the polyol is silicate PVA, the solid substrate and the silicate PVA being coupled by siloxane bonds.

Advantageously, the solid substrate is glass coupled to silicate PVA.

In another embodiment, the substrate is rayon fiber coupled to PVA by radical polymerization of polyvinyl acetate on said fiber followed by conversion of the polyvinyl acetate into PVA by hydrolysis.

Preferably, the substrate is rayon fiber coupled to PVA.

Preferably, the substrate is rayon fiber coupled to sorbitol.

Advantageously, the fatty acid is selected from stearic acid, palmitic acid and behenic acid.

Preferentially, grafting of the fatty acid is carried out by heterogeneous-phase esterification in the presence of acid chloride having an aliphatic chain comprising at least 12 carbon atoms.

The invention is also dedicated to a treated solid substrate able to be obtained by the process according to the invention.

The invention also relates to a process for manufacturing and treating paper or cardboard, comprising the following steps:
a) providing cationic starch coupled to PVA, said PVA bearing free hydroxyl groups;
b) then manufacturing paper or cardboard by flocculation of cellulose fiber in the presence of the cationic starch coupled to PVA of the preceding step on order to produce paper or cardboard comprising cationic starch coupled to PVA;
c) grafting at least one fatty acid having an aliphatic chain comprising at least 12 carbon atoms on said paper or cardboard substrate by esterification of at least one free hydroxyl group of said PVA.

Preferably, grafting of the fatty acid is carried out by heterogeneous-phase esterification in the presence of acid chloride having an aliphatic chain comprising at least 12 carbon atoms.

Another object of the invention is paper or cardboard able to be obtained by the process according to the invention.

DETAILED DESCRIPTION OF THE INVENTION

The invention relates to the treatment of solid substrates to confer barrier properties and in particular water, gas, grease and water-vapor barrier properties.

The invention allows the treatment of solid substrates coupled to a polyol wherein the polyol preserves free hydroxyl groups. The coupling of polyols on a solid substrate is in addition carried out according to techniques known to persons skilled in the art. The treatment of these substrates coupled to a polyol is carried out by surface treatment by grafting fatty acids by the chromatogeny techniques disclosed in patent EP 1007202 and international application WO2009/083525.

All types of solid substrates can be treated by the processes according to the present invention. By solid substrate is meant any substrate, support, material or object that can be coupled to a polyol. Practically all organic or inorganic materials can be coupled to a polyol using techniques well-known to persons skilled in the art.

In a preferred embodiment, the solid substrate is a textile fiber such as rayon fiber, fiber containing cellulose I and synthetic fiber.

In another embodiment, the substrate is selected from inorganic solid substrates comprising silanol groups. These are in particular solid substrates comprising silica (glass, quartz, particles of clay such as talc, montmorillonite or synthetic clays such as laponite).

In another embodiment, the solid substrate is paper fiber such as, for example, cellulose fiber.

In particular, the invention relates to a process for treating a solid substrate, comprising the following steps:
a) providing a solid substrate coupled to a polyol, said polyol bearing free hydroxyl groups,
b) grafting at least one fatty acid having an aliphatic chain comprising at least 12 carbon atoms on said solid substrate coupled to a polyol by esterification of at least one free hydroxyl group of said polyol.

In another embodiment, the invention relates to a process for treating a solid substrate, comprising the following steps:
a) Coupling of a polyol on said solid substrate, said polyol preserving free hydroxyl groups,
b) Grafting at least one fatty acid having an aliphatic chain comprising at least 12 carbon atoms on said solid substrate coupled to a polyol by esterification of at least one free hydroxyl group of said polyol.

This treatment confers on the treated solid substrates water barrier properties as well as, if need be, gas, grease and water-vapor barrier properties.

The process according to the invention can be applied to any solid substrate able to be coupled to a linear polyol. In the present invention, by the expression "substrate coupled to a polyol" is meant a substrate bound to a polyol by a strong bond that is not unstable in the presence of water and that is not sensitive to esterification reaction with fatty acids. This bond is thus typically stronger than hydrogen bonds (generally defined as weak bonds), which are easily displaced and thus sensitive to water. In the processes of the present invention, the polyol is coupled to the solid substrate by covalent or polyelectrolyte (polyelectrostatic) bonds. This coupling is carried out in such way that the polyol preserves free hydroxyl groups. The cooperative effects of the various electrostatic interactions brought into play in bonds of the polyelectrolyte type make these bonds stable in the presence of water.

By "polyelectrolyte bonds" or "polyelectrostatic bonds" is meant in the description of the present invention bonds of the ionic type.

International application WO2009/083525 discloses the grafting of fatty acids on solid substrates coated with PVA. In this prior art, PVA is not bound to the solid substrate by strong bonds.

By polyol is meant any linear or branched molecule comprising at least two hydroxyl groups. In an embodiment, the polyol is an alditol.

In preferred embodiments, the polyol is selected from PVA, glycerol, erythritol, sorbitol, xylitol, arabitol, ribitol, dulcitol, mannitol, volemitol, maltitol, isomaltitol, lactitol and polyol polymers obtained by reaction between polyols and epoxides of alkenes such as epichlorohydrin.

Preferably, the polyol is selected from PVA and sorbitol.

By "PVA" is meant polyvinyl alcohol. It is typically obtained by radical polymerization of vinyl acetate in methanol, followed by alcoholysis. According to the degree of hydrolysis, a certain quantity of acetate remains attached to the polymer chain. PVA is thus characterized by its molar mass and its degree of hydrolysis.

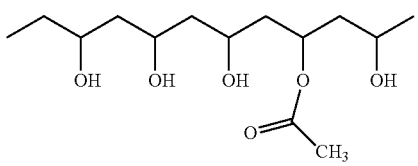

Simplified diagram of a PVA molecule

With regard to PVA coupled to the solid substrate, its molar mass and its degree of hydrolysis do not have particular importance on the stability of the film formed, in contrast to films made up of free PVA. The role of this PVA is above all to provide hydroxyl groups which can be esterified by fatty acids during the subsequent grafting reaction.

Preferably, the PVA has a degree of hydrolysis higher than 80%, 85%, 88%, 90%, 95%, 98%, and more preferentially higher than 99%.

As PVA itself can confer barrier properties, it can be advantageous to optimize the barrier properties by using PVA having a molar mass sufficiently high to confer such properties.

Preferably, the PVA has a molar mass (Mw) of at least 10,000, 15,000, 30,000, 50,000 or at least 75,000 g/mol.

More preferentially, the PVA has a molar mass (Mw) of between 13,000 and 300,000, 30,000 and 300,000, 50,000 and 200,000, 75,000 and 200,000, 100,000 and 200,000 g/mol.

Molar mass (Mw) represents the molar mass in weight; it is preferably determined by diffusion in size-exclusion chromatography.

Coupling of the polyol on the solid substrate is carried out according to standard techniques known to persons skilled in the art. Any coupling method can be used in the processes of the present invention.

The polyol plays the role of a bifunctional molecule whose hydroxyl groups allow grafting of the fatty acid and which in addition has other groups able to bind it on the solid support. The only stipulation being that the polyol preserves free hydroxyl groups for grafting of fatty acid.

In a first embodiment, the polyol is coupled to the solid substrate directly by its hydroxyl groups by strong bonds of the covalent or polyelectrolyte (polyelectrostatic) type. In other embodiments, the polyol bears groups via which the polyol is coupled to the solid substrate. Preferably, hydroxyls of the polyol bear groups via which the polyol is coupled to the solid substrate. The group via which the polyol is coupled to the solid substrate is, for example, selected from ionizable groups, anionic groups, cationic groups and silicate groups.

In the same way, the polyol can be constituted by coupling between a nonlinear polymer such as starch and linear polyols such as PVA. Coupling of the starch with PVA or sorbitol is carried out in the presence of epichlorohydrin and soda. It is then possible to use the starch moiety of this hybrid molecule to provide bonding on a solid substrate. The adhesion of cationic starch on negatively-charged paper fibers is thus well-known in the paper manufacturing process.

In certain embodiments, the solid support bears groups allowing a polyelectrolyte (polyelectrostatic) or covalent bond with the polyol. The solid support can, for example, bear ionizable groups, anionic groups, cationic groups, silanol groups or hydroxyl groups.

In an embodiment, the solid substrate and the polyol bear ionizable groups. In aqueous medium and at a given pH, these ionizable groups make it possible to couple the solid substrate and the polyol by polyelectrolyte (polyelectrostatic) bonds.

In a preferred embodiment, the solid substrate bears negative charges provided by carboxylic, sulfonic or phosphoric groups. Such functional groups can be provided to organic supports such as fibers of cellulose or of polymers by standard organic chemistry reactions or by oxidations carried out in plasma medium. Substrates with weaker acid functional groups such as silica, glass, talc, montmorillonite or laponite, which are negatively ionized at pH 7, can also be used.

Advantageously, the solid substrate bears an anionic group and the polyol is a cationic PVA.

By cationic PVA is meant a PVA derivative with cationic groups. These products are well-known to persons skilled in the art (Moritani T & Yamauchi J, 1998a; Fatehi P, Xiao H, 2010; Liesiene J et al., 2005; Liesiene J, 2009) and are available commercially (e.g. POVAL CM 318 from Kuraray). They can be obtained by copolymerization of vinyl acetate and cationic monomers followed by alcoholysis of the cationic polyvinyl acetate formed (Moritani T & Yamauchi J, 1998a) or synthesized by reaction of PVA with specific cationic reactants (Fatehi P, Xiao H, 2010; Liesiene J et al., 2005; Liesiene J, 2009) commonly used to cationize starch.

In another preferred embodiment, the solid substrate bears a cationic group and the polyol is anionic PVA.

By anionic PVA is meant a PVA derivative with anionic groups. These products are well-known to persons skilled in the art (Moritani T & Kajitani K, 1997; Moritani T & Yamauchi 1, 1998b) and are available commercially. Kuraray has a range of anionic (carboxylic) PVA with various degrees of hydrolysis and molecular weights. Carboxyl groups grafted on PVA chains increase the hydrophilic character of the PVA and thus promote its use in applications using ionic interactions.

In another embodiment, the solid substrate bears silanol groups and the polyol is silicate PVA, the solid substrate and silicate PVA being coupled by siloxane bonds. The solid substrate is, for example, glass, quartz, particles of silica, of talc, of montmorillonite or of laponite.

By silicate PVA is meant a PVA derivative with silicate groups. These products are well-known to persons skilled in the art (Maruyama Hitoshi & Okaya Takuji, 1994a; Maruyama Hitoshi & Okaya Takuji, 1994b) and are available commercially. Kuraray markets silicate PVA under the name Kuraray R-Polymers (e.g. R-1130, R-3109 or R-2105), known for their ability to adhere to inorganic substrates such as glass. These silicate PVA are also used as binders for all types of silica commonly used as pigments in inks. Silicate PVA also have the property of binding to other inorganic solid substrates such as aluminum or steel stripped of SiOH functional groups.

In other embodiments, the solid substrate is coupled to a polyol by covalent bonds.

For example, the coupling of PVA molecules on rayon fiber by a copolymerization mechanism can be carried out according to techniques known to persons skilled in the art (Horn and Simmons, 1965; Borbely et al. 2001). The substrate is rayon fiber coupled to PVA by radical polymerization of polyvinyl acetate on said fiber followed by conversion of polyvinyl acetate into PVA by hydrolysis. The solid substrate coupled to a polyol can thus be rayon fiber coupled to PVA. This technique can be extended to other natural or synthetic fibers.

Polyols such as PVA or sorbitol can also be coupled to rayon or cellulose I fiber (cotton, flax, hemp, paper fiber of coniferous or broad-leaf trees, virgin or recycled, cellulose whiskers, microcrystalline cellulose) by epichlorohydrin coupling. The coupling of rayon fiber is carried out in the presence of soda, epichlorohydrin as well as PVA or sorbitol.

The solid substrate coupled to a polyol can thus be rayon fiber coupled to PVA or sorbitol.

In another embodiment, linear hydroxylated polymers are coupled on an intermediate molecule such as cationic starch. This cationic starch is able to be bound by means of its positive charges on surfaces bearing negative charges such as paper fiber. Cationic starch coupled to linear polyols can be used in the manufacture of paper or cardboard to confer barrier properties on these products after reaction of polyols with fatty acids.

The solid substrate coupled to polyol is then grafted on the surface with fatty acids.

By grafting is meant the establishing of covalent bonds between the polyol and the fatty acids and more particularly esterification of the free hydroxyl groups of the polyol.

This grafting is carried out according to the methods disclosed in European patent EP 1 007 202 and international application WO2009/083525.

With regard to PVA, the surface grafting of linear polyol chains by fatty acids is expressed at the molecular level by sequential grafting of polyol molecules on the surface of the film. By sequential grafting is meant grafting wherein the polyol molecule consists of alternately grafted and non-grafted segments. The grafted segments form a phase of grafted polyols which is directed toward the exterior of the support. The non-grafted segments also form a phase but one directed toward the interior of the support. The continuous or discontinuous character of these phases will obviously depend on the bonding density of polyols on the surface of the solid substrate. Significant swelling related to the grafting reaction makes it possible to obtain a continuous phase for the grafted polyol segments in spite of a relatively low bonding density. In contrast with the case of our prior patent wherein a continuous PVA coating is created, it is not necessary herein to completely coat the substrate with polyols.

By "fatty acid" is meant an organic acid composed of a linear hydrocarbon chain terminated at one of its ends by a carboxylic group and at the other end by a methyl group. The fatty acids used for grafting are fatty acids having an aliphatic chain comprising at least 12 carbon atoms. Preferably, the fatty acid is a fatty acid having an aliphatic chain comprising 12 to 30 carbon atoms. Preferentially, the fatty acid is a fatty acid having an aliphatic chain comprising 16 to 22 carbon atoms. Preferentially, the fatty acid is a saturated fatty acid. In a preferred embodiment of the invention, the fatty acid is selected from stearic acid, palmitic acid and behenic acid. Preferably, grafting is carried out with stearic acid.

Typically, grafting of the fatty acid on the polyol is carried out by heterogeneous-phase esterification by chromatogenic chemistry techniques (EP1007202). This technique uses reagents of the acid chloride type but in the absence of solvent and catalyst during the grafting phase. In chromatogenic chemistry methods, grafting is carried out at a temperature above the melting point of the fatty acid chloride and below the melting point of the polyol. Preferentially, grafting is carried out between 70° C. and 185° C. Grafting of the fatty acid chloride is preferably carried out under nitrogen sweep at slightly decreased pressure (900 mbar) in order to eliminate the hydrochloric acid formed during the reaction.

In a preferred embodiment, grafting is thus carried out in the presence of fatty acid chloride having an aliphatic chain comprising at least 12 carbon atoms in gas state at a temperature between 70° C. and 185° C.

As has been seen, one of the characteristics of the invention is the fact that the reaction is not limited to hydroxyls present on the surface but penetrates inside by acylating hydroxyls quantitatively to form a thin film of grafted polyols. The thickness of this film naturally depends on reaction conditions and, in particular, stoichiometry.

The invention also has as an object treated solid substrates able to be obtained by the processes described above.

A particular aspect of the invention concerns the manufacture and treatment of paper in order to confer on this paper water barrier properties as well as, if need be, grease, gas and water-vapor barrier properties.

Traditionally, the manufacture of paper or cardboard comprises a step of flocculation of cellulose fiber with cationic starch. These processes of the prior art can be adapted by employing cationic starch coupled beforehand to polyol and particularly to PVA. This coupling between PVA and cationic starch can be carried out according to the techniques described above. In a preferred embodiment, the coupling between cationic starch and PVA is carried out in the presence of soda and epichlorohydrin according to techniques known to persons skilled in the art. The cationic starch coupled to PVA preferably comprises from 10% to 50% of PVA; preferably the cationic starch coupled to PVA comprises at least 20% of PVA by moles.

The cationic starch coupled to PVA is then used for flocculation of cellulose fiber in the manufacture of paper or cardboard. The quantity of cationic starch coupled to PVA is adjusted in order to use the same cationic charge as with traditional cationic starch. Cationic starch is added to a suspension of cellulose fiber, thus causing flocculation of the latter in the paper or cardboard manufacturing process. Cationic starch coupled to PVA is used in a quantity of at least 1% by weight in relation to the weight of cellulose fiber suspension; preferably, cationic starch coupled to PVA is used in a quantity of at least 3% by weight in relation to the weight of cellulose fiber suspension.

The paper or cardboard obtained thus contains starch coupled to PVA. Unexpectedly, the hydroxyl groups of this PVA remain accessible on the surface of the paper/cardboard in spite of the coupling of PVA to the starch. The following step is thus the treatment of this paper/cardboard by grafting fatty acids, thus conferring barrier properties.

The invention thus relates to a process for manufacturing and treating paper or cardboard, comprising the following steps:
a) Cationic starch coupled to PVA is provided, said PVA bearing free hydroxyl groups;
b) Paper or cardboard is then manufactured by flocculation of cellulose fiber in the presence of the cationic starch coupled to PVA of the preceding step in order to produce paper or cardboard comprising cationic starch coupled to PVA;
c) At least one fatty acid having an aliphatic chain comprising at least 12 carbon atoms is grafted on said paper or cardboard substrate by esterification of at least one free hydroxyl group of said PVA.

The invention thus relates to a process for manufacturing and treating paper or cardboard, comprising the following steps:
a) Coupling of PVA and cationic starch;
b) Manufacture of paper or cardboard by flocculation of cellulose fiber in the presence of the cationic starch coupled to PVA of the preceding step;
c) Grafting of at least one fatty acid having an aliphatic chain comprising at least 12 carbon atoms on said paper or cardboard substrate by esterification of at least one free hydroxyl group of said PVA.

Coupling of PVA to cationic starch is preferably carried out in the presence of soda and a crosslinking agent such as epichlorohydrin.

Grafting of fatty acid is carried out according to the techniques described above.

The invention also relates to paper or cardboard able to be obtained by the process described above.

FIGURES

FIG. 1: PVA chains anchored on a fiber and grafted by fatty acids

FIG. 2: Coupling by strong bonds, i.e. covalent or ionic bonds, between textile fiber and a polyol of the PVA type FIG. 3: Quantitative acylation of PVA chains anchored to the surface of fibers

EXAMPLES

Example 1

Chromatogenic Grafting of Carboxymethylated Silica Particles Bearing Cationic PVA Molecules Bound by Ionic Bonds The system chosen uses as substrate silica particles grafted by carboxymethyl groups (50 μm Sep-Pak® Accell Plus CM Waters). The latter are thus anionic at pH 7 and create around the silica particles a crown of negative charges. On the other hand, these particles being stripped of hydroxyl functional groups are not substrate for the grafting reaction of fatty acids by chromatogeny. The carboxymethylated silica particles were then coated with cationic PVA and grafted with stearic fatty acid by chromatogeny. Thus, 50 mg of carboxymethylated silica particles were added to 5 ml of 1% w/v cationic PVA solution (Poval CM 318, Kuraray). After 30 minutes at pH 7, the particles are decanted and rinsed several times with deionized water to eliminate cationic PVA not having reacted. After drying, the particles are characterized by elemental analysis. They are then briefly incubated with stearic acid chloride solution (Sigma-Aldrich) in 2% petroleum ether (petroleum ether 100/140° C., Accros) then decanted and placed in an oven for 5 minutes at 150° C. The particles are then washed exhaustively in acetone then characterized again by elemental analysis. The results are presented in the following table.

TABLE 1

Carbon content of carboxymethylated silica particles before and after chromatogenic grafting

| Particle type | Carbon content (%) |
| --- | --- |
| Initial CM silica | 5.4 |
| Initial CM silica incubated with neutral PVA | 5.3 |
| CM silica incubated with cationic PVA | 6.9 |
| CM silica incubated with cationic and grafted PVA | 17.3 |

The results obtained very clearly indicate that carboxymethylated silica particles bearing negative anionic loads interact strongly with statistical cationic PVA by exhibiting a significant increase in their carbon content (after grafting, the carbon content increases from 6.9% to 17.3%). No interaction is detected with neutral PVA, which clearly demonstrates that the cationic nature is required for interaction. These results thus indicate that cationic PVA polymers were indeed able, on the one hand, to anchor on the anionic surface of the particles by interactions of the polyelectrolyte type while, on the other hand, remaining a substrate for the grafting reaction of fatty acids, in spite of the even greater restriction of their degree of freedom.

Example 2

Chromatogenic Grafting of Handsheets Flocculated by Cationic Starch Coupled to PVA Molecules by Epichlorohydrin Coupling Cationic starch is an industrial molecule widely used for flocculation of cellulose fiber bearing negative charges in the paper manufacturing process. The paper thus obtained can then be subjected to chromatogenic grafting but a limited fatty acid grafting rate and resulting hydrophobia are observed. We have shown that it was possible to improve this grafting rate and this hydrophobia by coupling cationic starch chains with polyol chains highly reactive with respect to the chromatogeny reaction.

Thus, 10 g of Mowiol 4 98 PVA (Kuraray) is mixed with 20 g of cationic starch (Hicat 142, Roquette Frères, DS=0.04 and % N=0.37) in order to prepare 30% (w/v) aqueous solution. The mixture is then maintained at 90° C. until complete solubilization of the polymers, and then cooled. After cooling, soda (13 ml, 10 M) and then epichlorohydrin (2 ml) are added successively. The reaction is allowed to continue overnight. Next, deionized water is added and the gel formed is neutralized with acetic acid (7 ml), washed 3 to 4 times with hot deionized water and then broken up using a high-pressure homogenizer (Manton Gaulin) until a homogeneous solution is obtained. Finally, the product obtained is lyophilized and nitrogen content is determined by elemental analysis. This amounts to 0.28%. Taking into account the initial nitrogen content of 0.35% present in the cationic starch, it is possible to deduce that the coupling product comprises 76% of cationic starch and 24% of PVA.

The cationic starch bearing neutral PVA chains is then adsorbed on cellulose fiber during the manufacture of handsheets. The handsheets are then dried and grafted by chromatogeny with stearic acid chloride (C18) and the grafting ability of the bound PVA chains is demonstrated by measurements of basis weight and water resistance.

Handsheets were prepared from a 3 g/l suspension of bleached broad-leaf fiber. For comparison, handsheets were prepared containing in the mass 2% (g/g) of cationic starch in relation to fibrous matter and handsheets containing 3% (g/g) of cationic starch bearing PVA chains. Cationic starch adorned with PVA was added at a concentration of 3% in order to have the same cationic charge as the starting cationic starch. For example, to 500 ml of fibrous suspension must be added either 0.6 ml of 5% (g/g) cationic starch or 0.9 ml of 5% (g/g) cationic starch bearing PVA chains.

The handsheets were grafted, after drying, with stearic acid chloride by the so-called transfer method. A sheet of so-called transmitter paper is loaded with reagent by impregnation with 2% stearic acid chloride solution in petroleum ether 100/140. After complete evaporation of the solvent, this sheet is placed in contact with the substrate sheet and the sandwich thus comprised is placed for 10 minutes in an oven heated to 150° C. at slightly decreased pressure (900 mbar) and under nitrogen sweep. These conditions allow diffusion of the reagent from the transmitter toward the substrate. The substrate sheet is then separated from the transmitter sheet and analyzed. Before grafting, the handsheets were conditioned at 105° C. for 24 hours.

Basis weight and water resistance ($Cobb_{60}$) were measured before and after grafting. The results obtained are illustrated in the following table.

TABLE 2

Basis weights and Cobb values of handsheets before and after chromatogenic grafting

| | Handsheet: cationic starch | | Handsheet: cationic starch bearing PVA chains | |
|---|---|---|---|---|
| | Not grafted | Grafted C18 | Not grafted | Grafted C18 |
| Basis weight (g/m$^2$) | 97 | 99 | 100 | 106 |
| Water absorption-Cobb$_{60}$ (g/m$^2$) | Not measurable | 14 | Not measurable | 8 |

The basis weight of the handsheets is higher when cationic starch adorned with PVA chains is used, which suggests good retention of the polymer by the fibers. After grafting, a significant increase in basis weight is also observed in the case of handsheets containing cationic starch adorned with PVA. Measurements of water absorption using the Cobb test strengthen these observations. These results are particularly interesting because they demonstrate not only the fact that cationic starch chains bearing PVA molecules preserved the ability of the starting cationic starch to anchor on cellulose fiber by means of polyelectrostatic interactions but that they are better substrates for the chromatogenic grafting reaction than cationic starch chains by virtue of the bound PVA chains. More precisely, the PVA chains remain a substrate for the grafting reaction in spite of their immobilization by covalent bonds on cationic starch macromolecules and in spite of their association with cellulose fiber.

Example 3

Chromatogenic Grafting of Rayon Fibers Bearing PVA Molecules Grafted by a Copolymerization Mechanism The grafting or coupling of PVA molecules on rayon fibers by copolymerization mechanism is carried out according to techniques known to persons skilled in the art (R. A. Horn and F. A. Simmons, 1965; E. Borbely and J. Erdelyi, K. C. Gupta and S. Sahoo, 2001).

The grafting of polyvinyl alcohol chains is obtained by hydrolysis of poly(vinyl acetate) grafted beforehand on cellulose II (rayon) fiber by copolymerization according to a radical mechanism specific to vinyl polymers. This copolymerization can be controlled and carried out under precise conditions by means of the use of suitably selected catalytic systems.

Into a 250 ml three-neck round-bottom flask submerged in a 50° C. water bath and equipped with a mechanical stirrer, a reflux condenser and a thermometer are added successively 100 ml of 8% vinyl acetate monomer aqueous solution (Sigma-Aldrich), rayon fibers in the form of a textile strip (6 g), initiator of cerium and ammonium nitrate (Sigma-Aldrich) and nitric acid (Sigma-Aldrich). The quantities of cerium and ammonium nitrate and nitric acid are adjusted in order to obtain a final concentration of $1 \cdot 10^3$ mol/l and 0.01 mol/l, respectively. The contact time and thus the reaction time was 40 minutes. The reaction was then quenched with L-ascorbic acid (Sigma-Aldrich) and the strip of rayon fiber grafted by polyvinyl acetate was washed with acetone and then dried at 105° C.

The poly(vinyl acetate) grafted on the rayon fiber is then converted to polyvinyl alcohol by basic hydrolysis in the presence of 0.2 M hydro/methanolic potassium hydroxide solution. The rayon fibers bearing PVA are finally washed with deionized water and then dried. The weight gain amounts to 10% (or 0.6 g). After drying, the strip of rayon fiber adorned with PVA is grafted chromatogenically with stearic acid chloride. In parallel, a control strip of rayon fiber was grafted. Grafting was carried out by the transfer method described in example 2.

The strip of rayon fiber was characterized by IR in ATR mode after each treatment. The band specific to ester groups at 1735 cm$^{-1}$ was regarded as the reference band for copolymerization grafting as well as for chromatogenic grafting of polyvinyl alcohol chains. In the spectrum of rayon fibers grafted by copolymerization with poly(vinyl acetate) the ester groups band is visible at 1735 cm$^{-1}$ but disappeared from the spectrum after deacetylation of the poly(vinyl acetate) chains to reappear in the spectrum of the rayon fiber adorned with polyvinyl alcohol chains and grafted by chromatogeny. In relation to the control rayon fiber grafted, this band is more intense and clearly illustrates the ability of polyvinyl alcohol to increase the grafting ability of rayon fiber. Polyvinyl alcohol thus remains a grafting substrate in spite of its immobilization on rayon fiber. These results are also confirmed by the 3.6 g weight increase of fibers adorned with PVA after chromatogenic grafting, in relation to the starting rayon fiber strip (an increase of 60% by weight).

Example 4

Chromatogenic Grafting of Rayon Fibers Bearing Polyol Molecules of Various Molecular Weights Bound on the Surface by Coupling with Epichlorohydrin Two types of polyols were used: Mowiol 4 98 polyvinyl alcohol (Kuraray, molar mass 27,000 g/mol) and sorbitol (D-sorbitol, Sigma-Aldrich, molar mass 182 g/mol).

4.1. The Case of Mowiol 4 98

First, a solution of Mowiol 4 98 in soda is prepared. Into a 200 ml round-bottom flask equipped with a mechanical stirrer is added 100 ml of 20% (g/g) Mowiol 4 98 solution. The solution is then carried at 90° C. for 1 hour to solubilize the Mowiol. The system is then cooled at room temperature and soda is added (20 ml, 10 N). Rayon fibers in the form of a strip (2 g) are introduced into a 200 ml two-neck round-bottom flask in the presence of 5 ml of 2 N soda. After 30 minutes of stirring, epichlorohydrin (1 ml) was added, followed by incubation for 10 minutes, and then PVA in soda solution was added. The reaction was allowed to continue overnight. The rayon fiber strip is then recovered, washed with deionized water in order to remove the Mowiol not grafted on the fibers, and then dried. The weight increase is 15%. The strip is then subjected to chromatogenic grafting with stearic acid chloride (C18) as described in example 2. After grafting, the weight of the ribbon is 3.8 g. In parallel, a control strip of rayon fiber was also grafted with C18.

The chromatogenic grafting ability of the Mowiol chains bound on the rayon fiber was demonstrated by IR-ATR analysis. The peak at 1735 $cm^{-1}$ specific to ester groups was regarded as the reference peak for chromatogenic grafting of polyvinyl alcohol chains bound on rayon fibers as well as for chromatogenic grafting of rayon fibers. This peak is hardly detectable in the spectrum of C18 grafted rayon fibers but it is quite visible in the spectrum of fibers crosslinked with polyvinyl alcohol and then C18 grafted. Indeed, the rayon reacts chromatogenically with the fatty acids but, however, the quantity of grafted fatty acids remains very low. On the other hand, once crosslinked with polyvinyl alcohol chains, their ability to be grafted increases significantly, as observed by IR-ATR. Once again it was shown that polyvinyl alcohol chains act as excellent substrates for the chromatogeny grafting reaction even if they are stably bound on a solid substrate.

4.2. The Case of Sorbitol

The same protocol as in the preceding example is used while replacing Mowiol by sorbitol. The weight increase after coupling is 5%, and then after chromatogenic grafting the weight of the ribbon is 2.6 g, a 30% increase. The product obtained was characterized in the same manner as before, by IR spectroscopy, and with the same results.

Example 5

Chromatogenic Grafting of a Glass Plate on which Silicate PVA Groups were Anchored A glass plate of the microscope slide type is incubated with 1 ml of 2% w/v silicate PVA solution (Kuraray R-Polymers R-1130) to which 100 µl of acetic acid is added. The plate is then rinsed with distilled water, dried and subjected to chromatogenic grafting with stearic acid chloride. After treatment, the plate is rinsed with chloroform and dried. The plate is verified to have remained hydrophobic after washing with chloroform. An analysis using atomic force microscopy reveals the presence of a 200 nm-thick layer on top of the plate.

REFERENCES

Patent references

WO2009/083525
EP 1 007 202

Bibliographical References

Borbély E. and Erdélyi J., "Grafting of Industrial Cellulose Pulp with Vinyl acetate monomer by Ceric Ion Redox System as Initiator"

Fatehi P, Xiao H, "Effect of cationic PVA characteristics on fiber and paper properties at saturation level of polymer adsorption", Carbohydrate Polymers 79, p. 423-428, 2010

Gupta K. C. and Sahoo S., "Grafting of acrylonitrile and methyl methacrylate from their binary mixtures on cellulose using ceric ions" J. Appl. Polym. Sci., 79 (5), p. 767-778, 2001

Horn R. A. and Simmonds F. A., 1965, "Treatment of kraft cardboards and a kraft pulp with acrylonitrile"

Liesiene J et al., "Sorption of poly(vinyl alcohol) and its cationic derivative on silica oxide: effect of charge", Chemical Technology 2 (36)—ISSN 1392-1231—p. 51-56, 2005

Liesiene Jolanta, "Coating of Silica Surface with Polyvinyl alcohol): Effect of the Surface Charge", 2009—poster Maruyama Hitoshi & Okaya Takuji, "Study on the interaction between poly(vinyl alcohol) containing silanol groups at side chains and inorganic substances" Nippon Kagaku Kaishi (4), p. 365-70, 1994a Maruyama Hitoshi & Okaya Takuji, "Study on the composites of colloidal silica and poly(vinyl alcohol) modified with a small amount of silanol groups", Nippon Kagaku Kaishi (5), p. 450-5, 1994b Moritani T & Kajitani K, "Functional modification of poly (vinyl alcohol) by copolymerization: 1. Modification with carboxylic monomers", Polymer Vol. 38 No. 12, p. 2933-2945, 1997

Moritani T & Yamauchi J, "Functional modification of poly (vinyl alcohol) by copolymerization III. Modification with cationic monomers", Polymer Vol. 39 No. 3, p. 559-572, 1998a Moritani T & Yamauchi J, "Functional modification of poly (vinyl alcohol) by copolymerization: II. Modification with a sulfonate monomer", Polymer Vol. 39 No. 3, p. 553-557, 1998b

The invention claimed is:

1. Process for treating a solid substrate, comprising the following steps:
   a) providing a solid substrate coupled to a linear polyol by covalent or polyelectrolyte bonds, said polyol bearing free hydroxyl groups,
   b) grafting at least one fatty acid having an aliphatic chain comprising at least 12 carbon atoms on said solid substrate coupled to a polyol by esterification of at least one free hydroxyl group of said polyol,
   wherein the solid substrate bears silanol groups and the polyol is silicate PVA, the solid substrate and the silicate PVA being coupled by siloxane bonds.

2. Process for treating a solid substrate according to claim 1, wherein the solid substrate is glass coupled to silicate PVA.

3. Process for treating a solid substrate, comprising the following steps:
   a) providing a solid substrate coupled to a linear polyol by covalent or polyelectrolyte bonds, said polyol bearing free hydroxyl groups,
   b) grafting at least one fatty acid having an aliphatic chain comprising at least 12 carbon atoms on said solid substrate coupled to a polyol by esterification of at least one free hydroxyl group of said polyol, wherein the substrate is rayon fiber coupled to PVA by radical polymerization of polyvinyl acetate on said fiber followed by conversion of polyvinyl acetate into PVA by hydrolysis.

4. Process for treating a solid substrate, comprising the following steps:
   a) providing a solid substrate coupled to a linear polyol by covalent or polyelectrolyte bonds, said polyol bearing free hydroxyl groups,
   b) grafting at least one fatty acid having an aliphatic chain comprising at least 12 carbon atoms on said solid substrate coupled to a polyol by esterification of at least one free hydroxyl group of said polyol,
   wherein the substrate is rayon fiber coupled to PVA.

5. Process for treating a solid substrate, comprising the following steps:
   a) providing a solid substrate coupled to a linear polyol by covalent or polyelectrolyte bonds, said polyol bearing free hydroxyl groups,
   b) grafting at least one fatty acid having an aliphatic chain comprising at least 12 carbon atoms on said solid substrate coupled to a polyol by esterification of at least one free hydroxyl group of said polyol,
   wherein the substrate is rayon fiber coupled to sorbitol.

* * * * *